United States Patent
McCoy, Jr. et al.

(10) Patent No.: US 11,059,075 B2
(45) Date of Patent: Jul. 13, 2021

(54) SYSTEMS AND METHODS FOR ROBOTIC SUCTION GRIPPERS

(71) Applicant: AMP Robotics Corporation, Louisville, CO (US)

(72) Inventors: John C. McCoy, Jr., Thornton, CO (US); Matanya B. Horowitz, Golden, CO (US); James A. Bailey, Boulder, CO (US)

(73) Assignee: AMP Robotics Corporation, Louisville, CO (US)

( * ) Notice: Subject to any disclaimer, the term of this patent is extended or adjusted under 35 U.S.C. 154(b) by 0 days.

(21) Appl. No.: 17/084,339

(22) Filed: Oct. 29, 2020

(65) Prior Publication Data
US 2021/0046513 A1 Feb. 18, 2021

Related U.S. Application Data

(63) Continuation of application No. 16/136,441, filed on Sep. 20, 2018, now Pat. No. 10,864,555.
(Continued)

(51) Int. Cl.
*B07C 5/36* (2006.01)
*B25J 15/06* (2006.01)
*B07C 5/342* (2006.01)

(52) U.S. Cl.
CPC ............ *B07C 5/365* (2013.01); *B07C 5/3422* (2013.01); *B25J 15/0616* (2013.01);
(Continued)

(58) Field of Classification Search
CPC .............................. B07C 5/365; B07C 5/3422
(Continued)

(56) References Cited

U.S. PATENT DOCUMENTS

| | | |
|---|---|---|
| 3,168,467 A | 2/1965 | Dreyer |
| 3,716,307 A | 2/1973 | Hansen |

(Continued)

FOREIGN PATENT DOCUMENTS

WO 2016029299 3/2016

OTHER PUBLICATIONS

"Vacuum Gripper System—VGS"; Piab USA; http://www.piab.com/en-US/about/innovations/vacuum-gripper-system--Vgs/; pp. 1-2; Obtained online Sep. 11, 2018.
(Continued)

*Primary Examiner* — Terrell H Matthews
(74) *Attorney, Agent, or Firm* — Van Pelt, Yi & James LLP

(57) ABSTRACT

In one example embodiment, a robotic vacuum sorting system comprises: a suction gripper mechanism mounted to a sorting robot; a vacuum system coupled to the suction gripper mechanism; robot control logic and electronics coupled to the sorting robot and the vacuum system; and an imaging device coupled to the robot control logic and electronics. In response to an image signal from the imaging device, the robot control logic and electronics outputs robot control signals to control the sorting robot, and outputs one or more airflow control signals to the vacuum system to execute a capture action on a target object using the suction gripper. During the capture action, the robot control logic and electronics outputs control signals such that the vacuum system pulls a vacuum at the gripping port of the suction gripper mechanism as the suction gripper mechanism is applied to capture and hold the target object.

28 Claims, 13 Drawing Sheets

Related U.S. Application Data

(60) Provisional application No. 62/561,400, filed on Sep. 21, 2017.

(52) U.S. Cl.
CPC ....... *B25J 15/0658* (2013.01); *B25J 15/0675* (2013.01); *B07C 2501/0063* (2013.01)

(58) Field of Classification Search
USPC ........................................................ 209/577
See application file for complete search history.

(56) References Cited

U.S. PATENT DOCUMENTS

| | | | |
|---|---|---|---|
| 3,834,558 A | 9/1974 | Bru | |
| 6,732,897 B2 | 5/2004 | Dehart | |
| 7,157,274 B2 | 1/2007 | Böhm | |
| 7,298,478 B2 | 11/2007 | Gilbert | |
| 8,290,624 B2* | 10/2012 | Hjornet | B65B 35/18 700/259 |
| 8,691,164 B2 | 4/2014 | Butler | |
| 9,260,693 B2 | 2/2016 | Johnson | |
| 9,757,726 B2 | 9/2017 | Sharpe | |
| 10,576,630 B1* | 3/2020 | Diankov | B25J 9/163 |
| 2004/0055250 A1 | 3/2004 | Main | |
| 2008/0124779 A1 | 5/2008 | Oh | |
| 2010/0135760 A1* | 6/2010 | Hjornet | B65B 35/18 414/744.8 |
| 2011/0291433 A1 | 12/2011 | Feng | |
| 2013/0127192 A1 | 5/2013 | Regan | |
| 2014/0273192 A1 | 9/2014 | Sharpe | |
| 2014/0318645 A1 | 10/2014 | Koksal | |
| 2015/0017020 A1 | 1/2015 | Trott | |
| 2015/0268244 A1 | 9/2015 | Cho | |
| 2015/0328637 A1 | 11/2015 | Perrault, Jr. | |
| 2016/0039098 A1 | 2/2016 | Sanders | |
| 2016/0136816 A1 | 5/2016 | Pistorino | |
| 2017/0080571 A1* | 3/2017 | Wagner | B25J 9/1612 |
| 2019/0070734 A1* | 3/2019 | Wertenberger | B25J 9/1697 |
| 2019/0084012 A1* | 3/2019 | McCoy, Jr. | B07C 5/3422 |
| 2019/0168396 A1* | 6/2019 | Leidenfrost | B25J 15/022 |
| 2020/0048015 A1* | 2/2020 | Martin | B25J 15/0616 |

OTHER PUBLICATIONS

Andrew Jones; "High Speed Pancake stacking with Flexpicker Robots"; https://www.youtube.com/watch? v=v9oeOYMRvuQ; p. 1; Published: Jul. 15, 2009.

International Searching Authority, "International Search Report and Written Opinion from PCT Application No. PCT/US2018/051864 dated Mar. 22, 2019".

Variable Flow Venturi Vacuum Pumps {VDF Series); Published by Vaccon; https://www.vaccon.com/standard-products/variable-vacuum-pumps-vdf-series; pp. 1-2; Obtained online on Sep. 11, 2018.

Woodworking and wood handling; Piab USA; https://www.piab.com/en-US/applications/solutions/gripping-lifling--holding/woodworking-and-wood-handling/; pp. 1-2; Obtained online Sep. 11, 2018.

* cited by examiner

SYSTEMS AND METHODS FOR ROBOTIC SUCTION GRIPPERS

CROSS-REFERENCE TO RELATED APPLICATIONS

This Application is a continuation of U.S. patent application Ser. No. 16/136,441, entitled SYSTEMS AND METHODS FOR ROBOTIC SUCTION GRIPPERS, filed Sep. 20, 2018, which is a U.S. Patent Application claiming priority to, and the benefit of, U.S. Provisional Patent Application No. 62/561,400 titled "SYSTEMS AND METHODS FOR ROBOTIC SUCTION GRIPPERS" and filed on Sep. 21, 2017, each of which is incorporated herein by reference in its entirety.

BACKGROUND

Suction grippers are mechanisms used to pick up and move objects by applying a concentrated vacuum to portion of an object's surface with sufficient vacuumed strength to hold the object to the gripper. Suction grippers thus have some distinct advantages over mechanical grippers. For example, a suction gripper mechanism may be implemented with fewer mechanical parts than are subject to wear, malfunction or otherwise require maintenance. Suction grippers, however, face challenges operating in environments, such as recycling and consumer waste handling facilities, where the atmosphere is high in dust or other particulates, and where the target object that needs to be captured is not clean and may have random and irregular surfaces. Moreover, elements such as vacuum tubing and other hardware elements, may be larger and not as easy to route and/or position when used in combination with moving robotics equipment.

For the reasons stated above and for other reasons stated below which will become apparent to those skilled in the art upon reading and understanding the specification, there is a need in the art for systems and methods for robotic suction grippers.

SUMMARY

The embodiments of the present disclosure provide methods and systems for robotic suction grippers and will be understood by reading and studying the following specification.

In one example embodiment, a robotic vacuum sorting system comprises: a suction gripper mechanism pivotally mounted to one or more robotic arms of a sorting robot; a vacuum system coupled to the suction gripper mechanism; robot control logic and electronics coupled to the sorting robot and the vacuum system; and an imaging device coupled to the robot control logic and electronics; wherein, in response to an image signal from the imaging device, the robot control logic and electronics outputs one or more robot control signals to control the one or more robotic arms of the sorting robot, and outputs one or more airflow control signals to the vacuum system, to execute a capture action on a target object using the suction gripper; wherein during the capture action, the robot control logic and electronics outputs control signals such that the vacuum system pulls a vacuum at the gripping port of the suction gripper mechanism as the suction gripper mechanism is applied to capture and hold the target object.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

Figure 1:
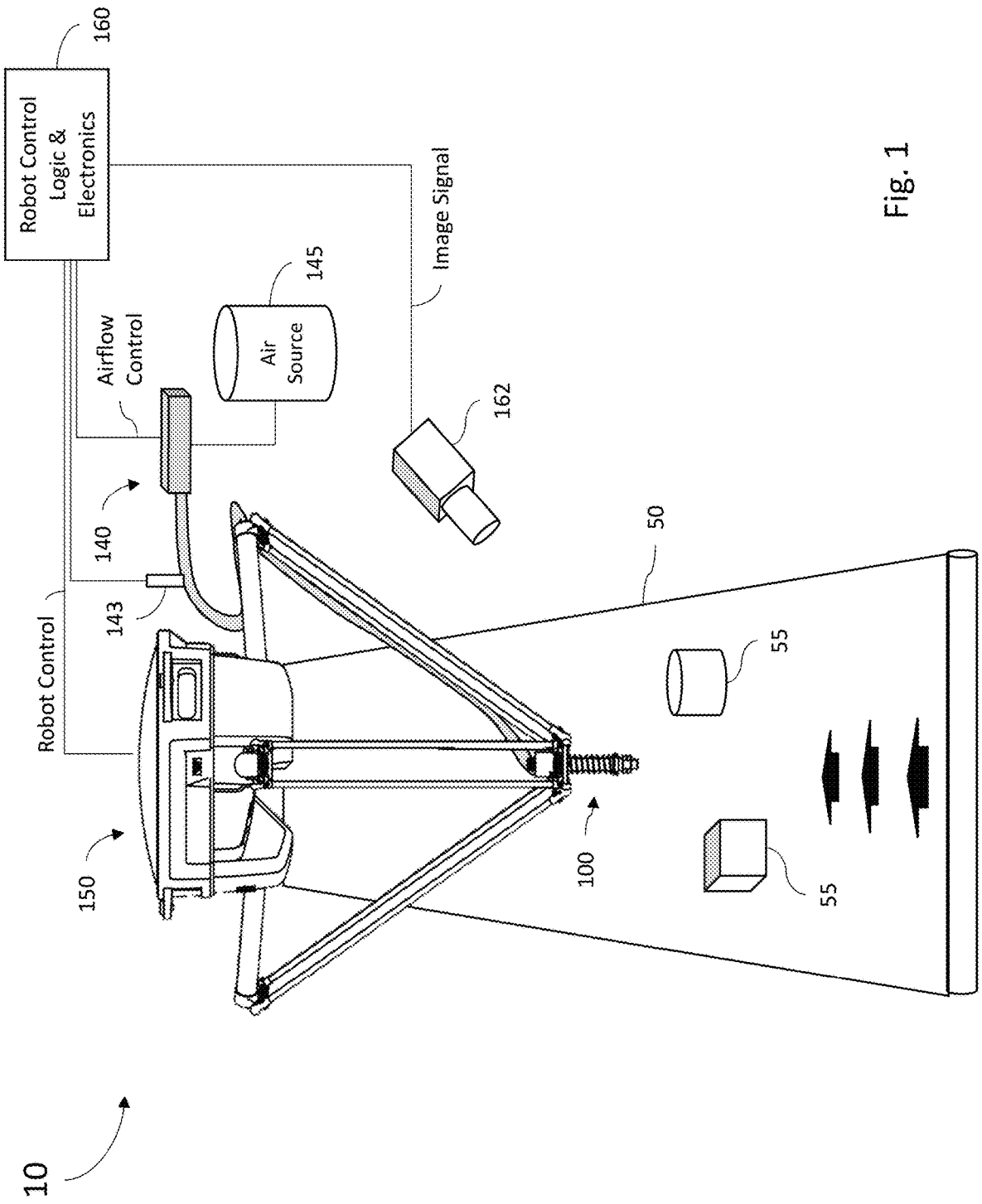
FIG. 1 is a diagram illustrating an example robotic vacuum sorting system of one embodiment of the present disclosure.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

In many industrial facilities such as recycling and/or other waste sorting facilities, materials are often transported via conveyer belts as various sorting machinery segregates the waste materials based on various criteria such as material type. For example, an initial material intake conveyer belt may transport a collection of mixed waste including, for example, glass, plastics and cardboard objects. Sorting machinery, as the waste material is conveyed, may be used to selectively sort and transfer different objects to different parts of the facility based on their material type. For example, glass bottles may be segregated and transported to a different part of the facility that handles plastic milk containers. Although waste products travelling on a conveyer belt are used as example target objects in the example embodiments described herein, it should be understood that in alternate implementations of these embodiments, the target objects need not be waste materials but may comprise and type of material for which it may be desired to sort and/or segregate. Moreover, although a conveyer belt is used as an example conveyance mechanism for transporting the target objects within reach of the suction gripper, it should be understood that in alternate implementations of these embodiments, other conveyance mechanism may be employed.

With embodiments of the present disclosure, computerized robot systems equipped with suction grippers are utilized to pick selected objects, referred to herein as "target objects" off of a conveyer belt (or other conveyance mechanism) either for the purpose of collecting selected materials for separate processing, or for removing undesired materials (i.e. objects that may be considered material contaminants) from the conveyer belt. As would be appreciated particularly for waste and recycling facilities, the target objects which need to be removed from the conveyer belt can be dirty, crushed and/or folded, making it difficult for a suction gripper to create a good seal on the object to allow it to secure and lift the target object off from the conveyer belt. Moreover, the conveyer belt, the target objects, and even the ambient atmosphere in general, can be expected to contain fine particles, dusts, or other contaminants (all referred to herein generically as "dust") that will be sucked into the suction gripper as it attempts to pick up the target objects.

The inventor of the present disclosure has realized that one reason suction grippers available in the art today are inhibited from operating in such a facility is that the gripping elements with which the suction gripper attempts to pull a vacuum on a surface of the target object are physically too small in scale (e.g. diameter and/or area) to achieve a suction force sufficient to hold the object given that a perfect seal is not attainable due to the condition of the target object's surface. In other words, the degree of dust contamination and the random irregular surface profile make it difficult to impossible to establish and maintain a vacuum seal for many objects. To address this issue, embodiments of the present disclosure provide for a suction gripper with a gripping port that is enlarged in scale as compared to suction grippers available in the art today. Increasing the diameter of the gripping port does increase the number of surface irregularities, defects, and contaminants that the gripping port must interface with. However, the total volume of air that may be pulled into the suction gripper by its gripping port (and thus the maximum vacuum force that the suction gripper is able to apply to the target object) is correspondingly increased by an even greater factor. The result in a mechanism that can achieve a sufficient hold (even with an imperfect seal) on the target object so that the target object can be lifted off of the conveyer belt and moved to a desired location.

For example, in some embodiments disclosed herein the suction grippers may comprise a gripping port of at least ¼ inch in diameter (or of an equivalent area for a non-circular gripping port). In some embodiments a vacuum can be pulled thought such a gripping port by a vacuum source that may pull at least 5 standard cubic feet per minute (SCFM) through the port at the point where the suction gripper contacts the surface of the target object. Applying such a vacuum through the gripping port has the undesirable side effect of also pulling into the internal components of the suction gripper mechanism additional dust and potentially other materials, such as plastic bags and wraps for example. Additional contamination of the suction gripper mechanism's internals will also be aggravated by the fact that the gaps present in the imperfect seal between the suction gripper and the target object will continue to pull in dust and contaminants even after the suction gripper achieves a hold sufficient to lift the object. For these reasons, embodiments present herein may also employ airflow reversal as discussed in greater detail below.

Figure 1A:
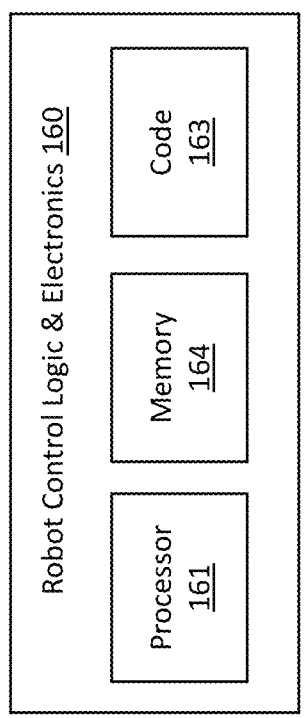
FIG. 1A is a diagram illustrating robot control logic and electronics of one embodiment of the present disclosure.

FIG. 1 is a diagram illustrating a robotic vacuum sorting system 10 of one embodiment of the present disclosure. As shown in FIG. 1, a suction gripper 100 is pivotally mounted to one or more arms of a sorting robot 150. System 10 supplies airflow to the suction gripper 100 via vacuum system 140. In some embodiments, the vacuum system 140 may be further pneumatically coupled to an air source 145, which may comprise a blower, an air compressor, a compressed air storage tank, or some combination thereof. Although this disclosure may refer to "air" with regards to "airflow", "air compressor" and other elements, it should be understood that the term "air" is used in a generic sense to refer to any compressible gas or mixture of gasses. The sorting robot 150 and vacuum system 140 are coupled to and controlled by robot control logic and electronics 160. In some embodiments, the Robot control logic and electronics 160 may comprise logic circuits or otherwise be implemented with one or more processors 161 coupled to a memory 164 and programmed to execute code 163 to implement the function attributed to robot control logic and electronics 160 described herein (as shown in FIG. 1A). As such, to communicate control signals, robot control logic and electronics 160 may further comprise elements to generate electrical and/or control pneumatic signals to the sorting robot 150 and vacuum system 140. In some implementations, robotic vacuum sorting system 10 further comprises at least one imaging device 162 (which may comprise, for example, an infrared camera, visual spectrum camera, or a some combination thereof) directed at a conveyer belt 50 that transports target objects (shown at 55) within the operating reach of the robotic vacuum sorting system 10. The imaging device produces an image signal that is delivered to the robot control logic and electronics 160 and which may be used by robot control logic and electronics 160 to send control signals to the sorting robot 150 to position the suction gripper 100, and send airflow control signals to the vacuum signal 140, in order to initiate a capture action, as further described below. In some embodiments, the robotic vacuum sorting system 10 may also comprise a pressure sensor 143 providing a signal to the robot control logic and electronics 160 so that it may vacuum is successfully achieved, as further discussed below.

Figure 2A:
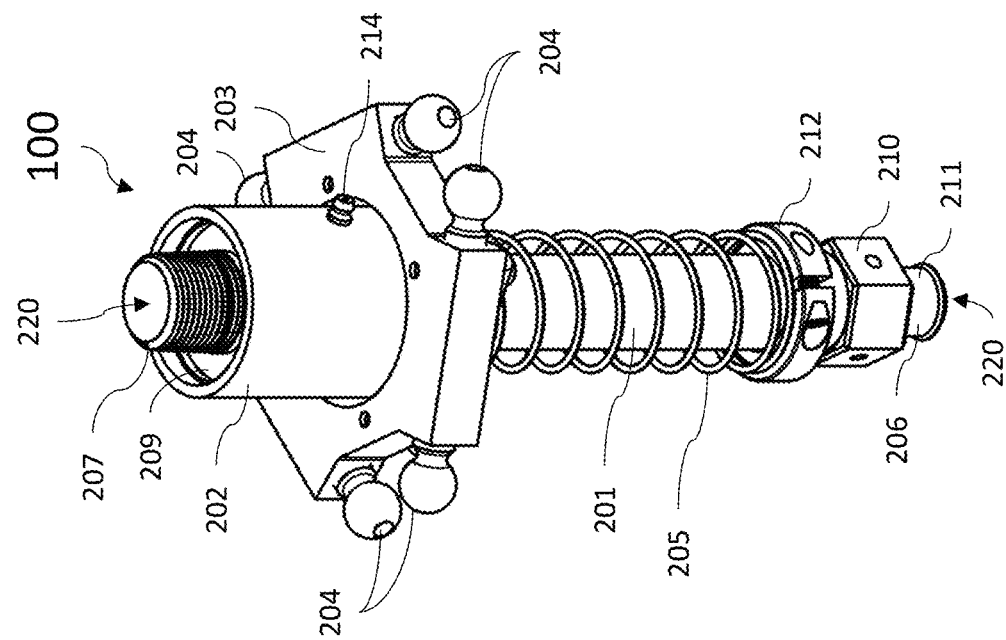
FIGS. 2 and 2A are diagrams illustrating an example suction gripper of one embodiment of the present disclosure.
Figure 2:
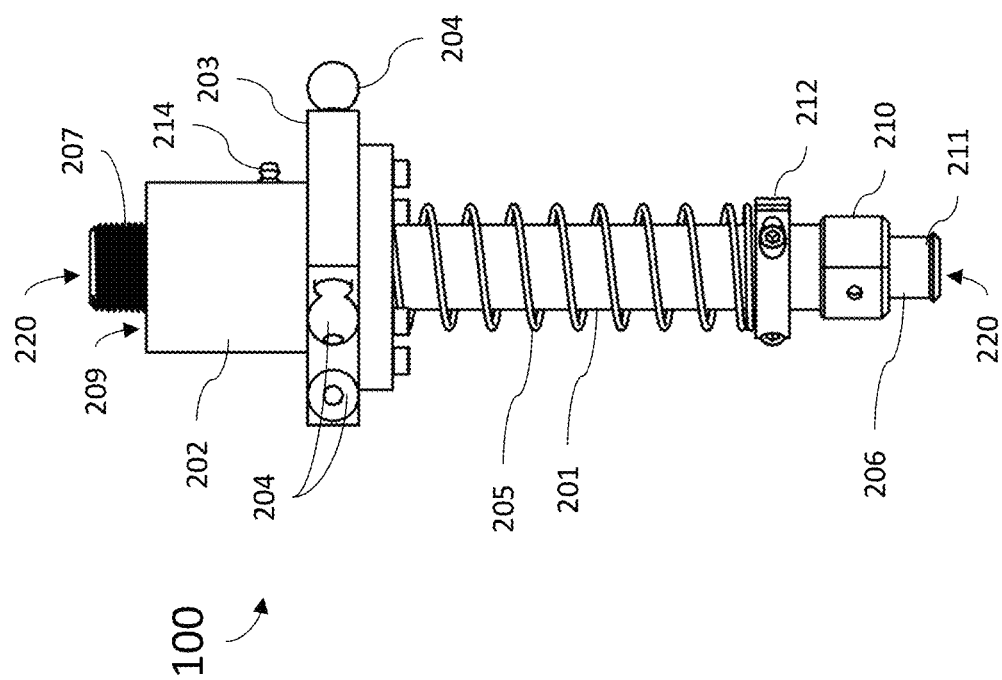

FIGS. 2 and 2A are diagrams illustrating a respective side view and tilted side view of a suction gripper mechanism 100 (also referred to herein as "suction gripper 100") of one embodiment of the present disclosure such as described with respect to FIG. 1. As shown in FIG. 2, the suction gripper mechanism 100 comprises a body assembly 202 that houses a linear bearing component 209, and a mounting assembly 203 rigidly secured around the body assembly 202 that houses the linear bearing component 209. In one embodiment, the mounting assembly 203 comprises a ring shaped assembly having a through hole through which the linear bearing component 209 is positioned and securely attached. In some embodiments, the mounting assembly 203 and the body assembly 202 may be rigidly coupled together such as through a weld or mechanical fastener. In some embodiments, the mounting assembly 203 and body assembly 202 may comprise a single integrated part. The mounting assembly 203 further comprises one or more mounting point 204 via which the mounting assembly 203 is pivotally coupled to the sorting robot 150.

Figure 2B:
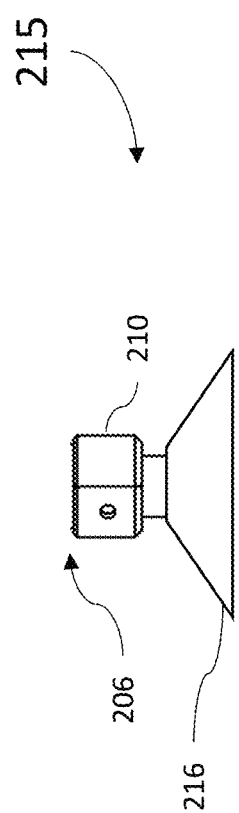
FIG. 2B is a diagram illustrating an example replaceable suction cup assembly of one embodiment of the present disclosure.

As shown in FIGS. 2 and 2A, the suction gripper mechanism 200 further comprises a linear shaft element 201 secured within the linear bearing 209 and having a freedom to travel axially up and down with respect to the axis of the linear bearing 209. The linear shaft 201 comprises an internal airflow passage 220 configured to communicate an airflow (having either a positive or negative air pressure) between an airflow application port 207 positioned at a first end of the linear shaft 201 and a gripping port 206 positioned at the opposing second end of the linear shaft 201. As illustrated in FIG. 2B a suction cup assembly 215 comprising a flexible cup element 216 (which may be a rubber, latex, or other flexible material) and removable coupler 218 can be attached to the gripping port 206. As mentioned above, the linear shaft 201 is free to travel axially up and down within a linear bearing 209. A spring mechanism 205 is positioned between the mounting assembly 203 and a stop device 212 located near the distal second end of the linear shaft 212 proximate to the gripper port 206, to hold the linear shaft 201 in a fully extended position when the suction gripper 100 is not holding a target object 55. A top view of the mounting assembly 203 as viewed from airflow application port 207 is provided in FIG. 2C.

Figure 3A:
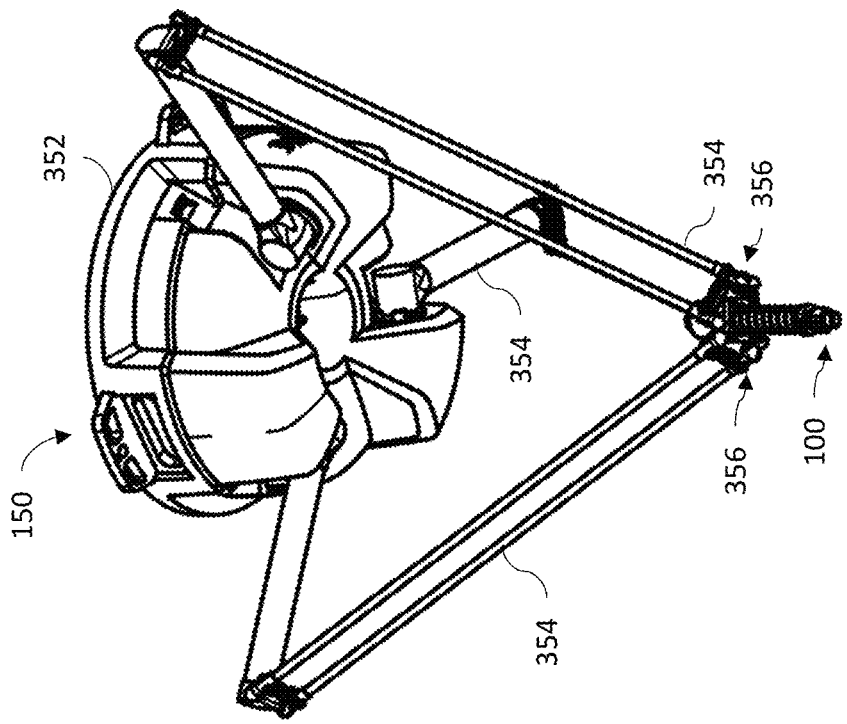
FIGS. 3 and 3A are diagrams illustrating an example of a sorting robot in combination with a suction gripper of one embodiment of the present disclosure.
Figure 3:
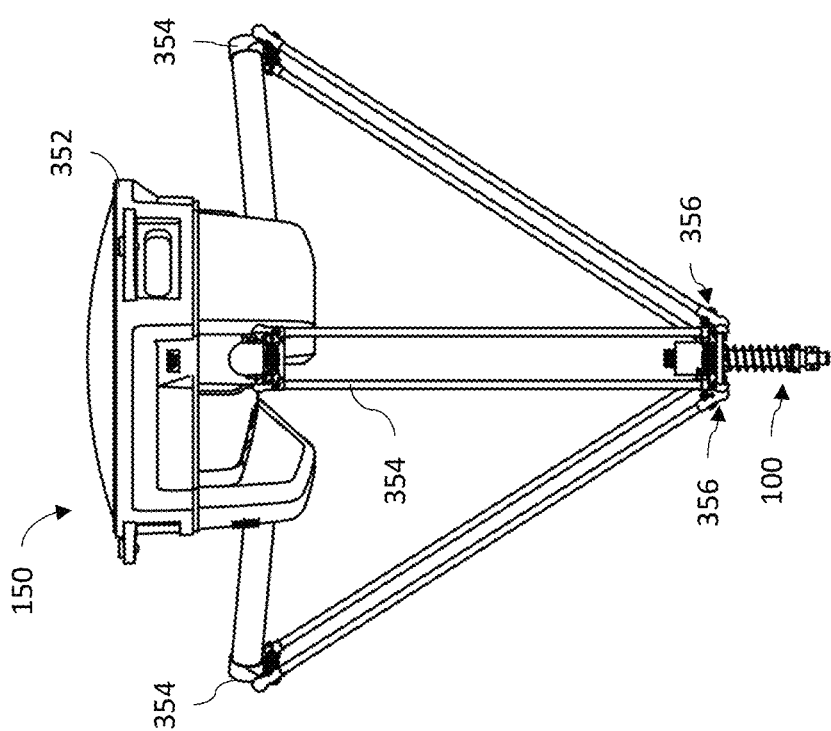
Figure 3B:
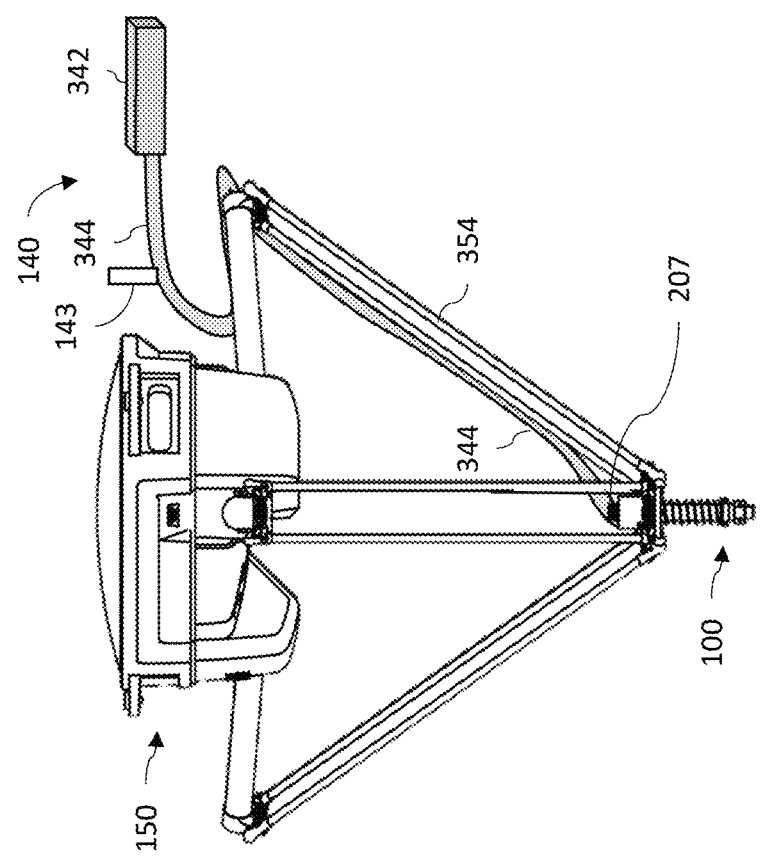
FIG. 3B is a diagram illustrating an example of a sorting robot in combination with a suction gripper and vacuum system of one embodiment of the present disclosure.

FIGS. 3, 3A and 3B illustrate the robotic actuator 352 and robotic arms 354 of the sorting robot 150 with a suction gripper mechanism 100 coupled to a distal end of the robotic arms 354. Robotic actuator 352 controls the position of the robotic arms 354 based on the robot control signals from the robot control logic and electronics 160 in order to position the suction gripper mechanism 100. As mentioned above, the distal end of the robotic arms 354 can each be configured to engage with the mounting points 204 of the mounting assembly 203 to secure the suction gripper mechanism 100 to the robotic arms 354. In one such embodiment, this mounting assembly 203 may be constructed to fit into a Delta-style of robot, as shown in FIGS. 3, 3A, and 3B. In other embodiments, other style robots may be utilized. Although the sorting robot 150 in FIGS. 3, 3A and 3B are shown as comprising three robotic arms 354, it should be appreciated that in other implementations, sorting robot 150 may comprise either a greater, or fewer, number of robotic arms 354.

In operation, the robot control logic and electronics 160 is programed to operate both the robotic arms 354 and the vacuum system 140 to perform what is referred to herein as executing a "capture action" or a "pick" on target object 55. In some embodiments, in operation, a capture action comprises at least positioning the suction gripper 100 over a target object 55, activating the vacuum system 140, and controlling the sorting robot 150 to lower the suction gripper 100 towards the target object 55 and make contact while applying a vacuum to the surface of the target object 55. Although the system may have some sense of how tall a target object 55 is before it attempts a pick (for example, by processing data such as an image captured by imaging device 162 or data from another sensor), the sorting robot 150 cannot be certain of exactly how tall the target object 55 is. For this reason the suction gripper 110 can be configured such than when contact is made with the target object 55, the force of contact will cause the bottom end of linear shaft 201 to slide up into the linear bearing 209 (which will correspondingly cause the opposing top end of the linear shaft 201 to slide out from the linear bearing 209) and the spring mechanism 205 to compress. In this way, target objects of various dimensions can be accommodated without causing damage to components of the robot 150 from the force of impact. When the capture action is complete and the vacuum deactivated by the robot control logic and electronics 160, the spring mechanism 205 will extend the linear shaft 201 back to its fully extended position. In some embodiments, at the completion of each capture action, the robot control logic and electronics 160 controls the vacuum system 140 to optionally reverse the airflow through the suction gripper 100 so that a positive air is flowing out from gripping port 206. Airflow reversal may serve not only to release and/or propel the target object 55 from the suction cup assembly 215, but also purge dust from the vacuum system 140 as well as expel other materials (such as plastic bags or wraps) that were drawn into the internal airflow passage 220 of suction gripper 100.

Figure 2C:
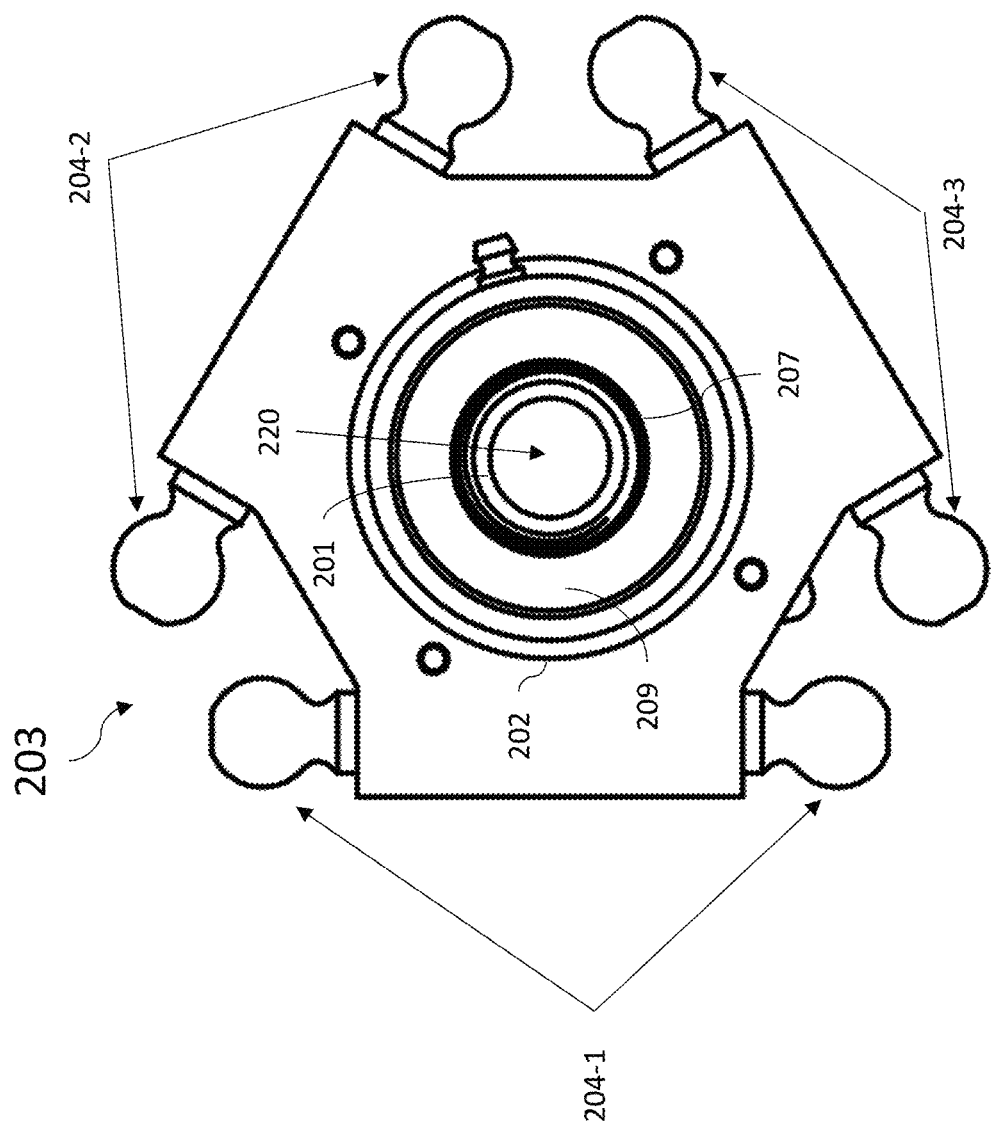
FIG. 2C is a diagram illustrating an example mounting assembly of one embodiment of the present disclosure.

In some embodiments, the mounting assembly 203 may be configured in a center-mount configuration, meaning that it position the suction gripper 100 in a center position between the plurality of robotic arms 354, as illustrated by the examples shown in FIGS. 3, 3A and 3B. As shown in FIG. 2C, in some embodiments, the mounting assembly 203 may comprise a plurality of ball shaped mounting points 204 positioned around the circumference of mounting element 203, each compatible to mate with complementary socket elements at the distal ends of the robotic arms 354 such that each define a ball-and-socket coupling joint securing the mounting assembly 203 to the robotic arms 254. The ball-and-socket coupling joints allow sufficient freedom for the robotic arms 354 to pivot around the suction gripper 100 in multiple directions with sufficient clearance to avoid interferences while positioning and operating the suction gripper 100 during a capture action. The center-mount configuration also allows the linear shaft 201 to travel freely to extend extent up through the linear bearing 209 above the mounting assembly 203 without interfering with the freedom of motion of the robotic arms 354 as would be the case if the suction gripper 100 were mounted in an offset position with respect to a center axis defined at a center point between the robotic arms 354. In one embodiment, each robotic arm 354 is secured to the mounting assembly 203 by set, or pair, of ball and socket coupling points (shown at 204-1, 204-2 and 204-3) each arrange within a plane oriented normal to the linear shaft 201's direction within linear bearing 209.

As discussed above, the suction cup element 216 shown in FIG. 2B may be mounted to the gripping port 206 by replaceable coupler 210. As shown in FIGS. 2 and 2A the coupler may comprise a barbed lip or recess (shown at 211) which the flexible suction cub 216 member is stretched over or otherwise held by a friction fit in order to secure it to the coupler 210. The coupler 210 in turn may be secured around the gripper port 206, for example, by set screws that tighten to secure the coupler to the linear shaft 201. In other embodiments, another fastening technique may be used. For example, in some embodiments the coupler 211 may be fastened to the linear shaft 201 by a threaded connection. In this way, a facility may keep as spare parts pre-assembled combinations of a flexible suction cub 216 members installed on a replaceable coupler 210. Should a flexible suction cub 216 become degraded in operation, the replaceable coupler 210 may be quickly disengaged from the gripping port 206 and a new assembly comprising a new flexible suction cub 216 preinstalled on a new replaceable coupler 210 immediately installed onto the gripping port.

As illustrated in FIG. 3B, in some embodiments, the vacuum system 140 comprises a vacuum generator 342 coupled to the airflow application port 207 of suction gripper 100 by air supply tubing 344. The air supply tubing 344 may be routed along and succored to one of the robotic arms 354. In one embodiment, the vacuum generator 342 comprises a compressed air driven Venturi and/or Coanda vacuum system. That is the motive force that pulls a vacuum through supply tubing 344 is a flow of a compressed air stream (for example, supplied by air source 145) that flows through the vacuum generator 342. Utilization of a Venturi and/or Coanda vacuum generator avoids the problem of pulling dirty air into an intake of a vacuum motor. That is, if a vacuum motor were utilized in a dusty high particulate environment, inline filters would be necessary to prevent the accumulation of contaminants that would eventually fowl the internal of the vacuum motor. However, in dusty high particulate environment, inline filters would also frequently clog to limit the force of the vacuum available for the suction gripper 100 to secure a target object 55. These inline filters would thus need frequent maintenance resulting in significant downtime of system 10. The utilization of a Venturi and/or Coanda vacuum generator in combination with the suction gripper 100 reduces the need for filtration because such a vacuum system can internally separate dust particles from the airflow received from the suction gripper. Dust that is not separated by the vacuum system may be conveniently discharged, for example into an optional holding container, as opposed to being pulled into a vacuum motor.

Figure 4:
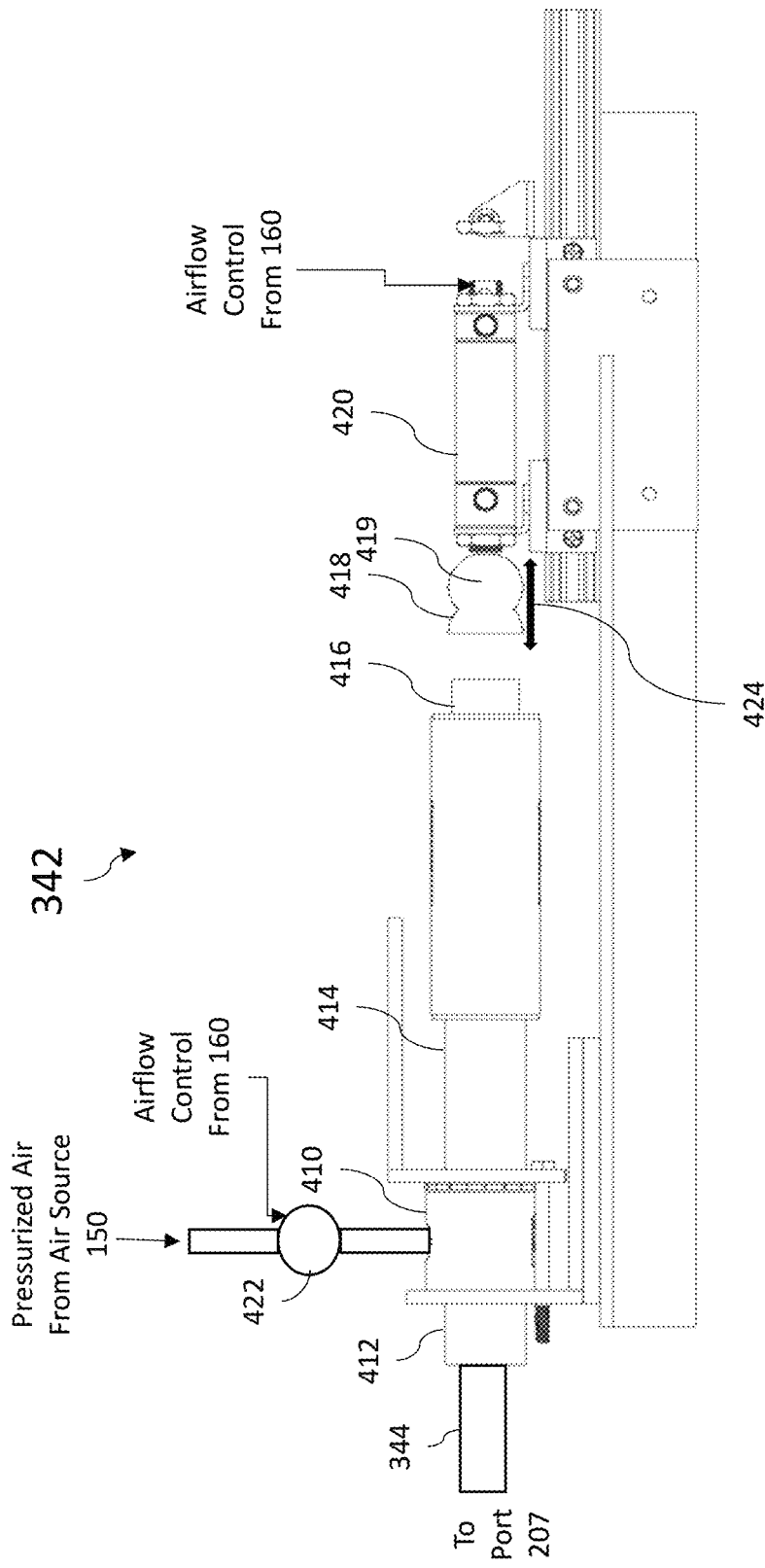
FIGS. 4 and 4A are diagrams illustrating an example vacuum generator of one embodiment of the present disclosure.
Figure 4A:
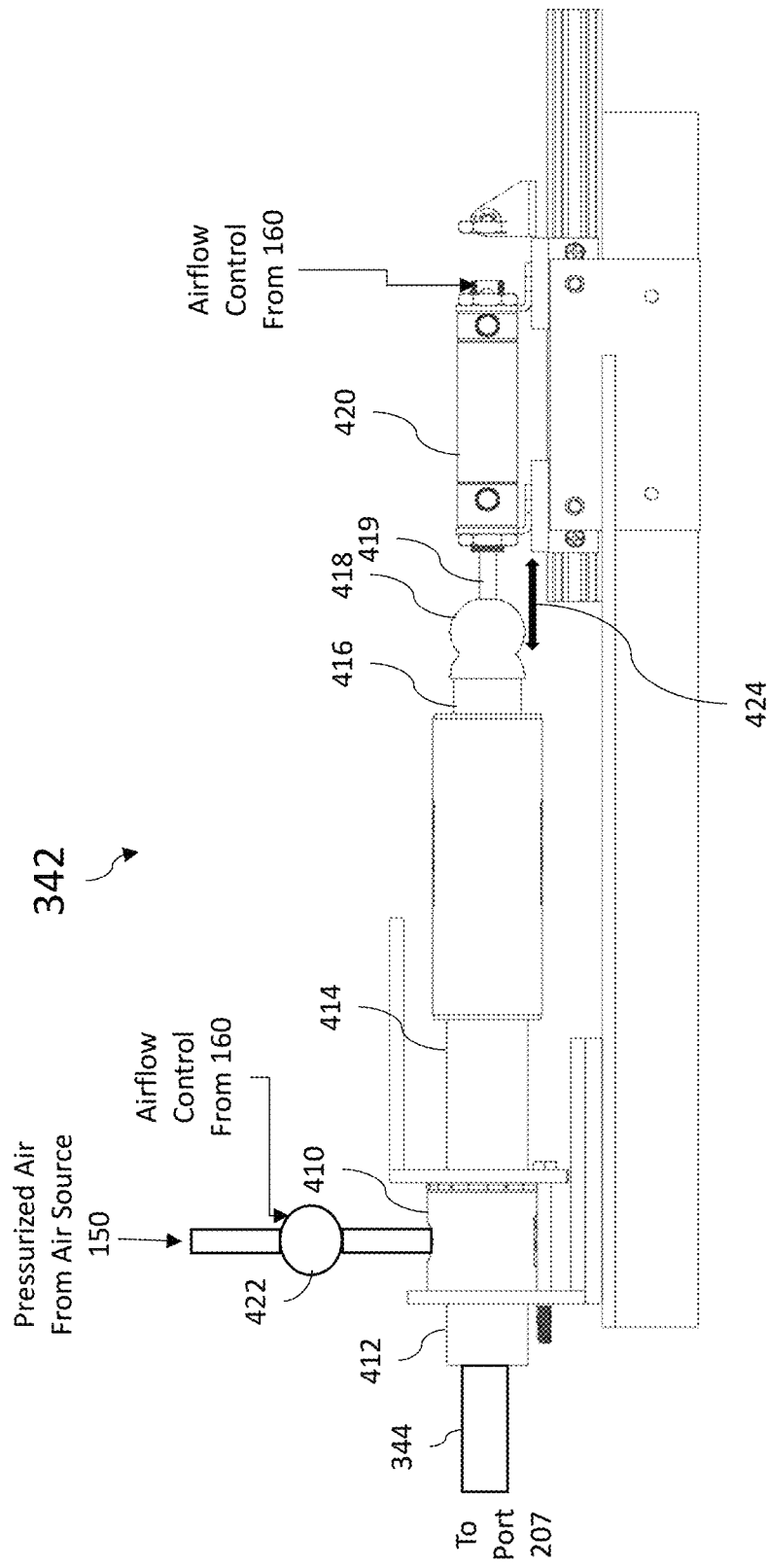

FIGS. 4 and 4A are diagrams illustrating an example vacuum generator 342 which may be utilized for implementing the vacuum system 140 for some embodiments of the present disclosure. Vacuum generator 342 comprises a chamber 414 having a pressurized air input port 410, a controlled airflow port 412 and an exhaust port 416. In this particular example embodiment, chamber 414 is a Venturi chamber that comprises one or more Venturi structural features (such as a Venturi nozzle). It should be appreciated that in other example embodiments, the chamber 414 of vacuum generator 342 may instead operate on the Coanda principle and comprise corresponding Coanda structural features. In one embodiment, pressurized air input port 410 receives a supply of pressurized air from the pressurized air source 145. The supply pressurized air from the pressurized air source 145 to the pressurized air input port 410 may be selectively controlled by a valve 422 responsive to the airflow control output from the robot control logic and electronics 160. In this way, the robot control logic and electronics 160 can control the activation and deactivation of the gripping force applied by the suction gripper 100. In operation, the positive pressure airflow applied at the pressurized air input port 410 flows into the Venturi chamber 414 and out exhaust port 416. The flow of air across one or more Venturi feature within chamber 414 create a negative air pressure at controlled airflow port 412 that pulls air into chamber 414 through the tubing 344 coupled to the suction gripper 100, thus creating suction at the gripping port 206 of the suction gripper 100. One example of a device comprising such a Venturi chamber 414 is the "Adjustable Inducer/Venture System" by Airtrim Pneumatic Conveyance Systems described in U.S. Pat. No. 6,732,897, the contents of which are incorporated by reference herein in their entirety. See also U.S. Pat. No. 3,716,307 and U.S. Patent Publication 2004/0055250, the contents of both of which are incorporated by reference herein in their entirety.

In some embodiments, vacuum generator 342 may comprise a reversible airflow generator meaning that the direction of airflow at controlled airflow port 412 may be reversed. As explained above, in some embodiments at the completion of each capture action (or at other times) the robot control logic and electronics 160 may control the vacuum system 140 to reverse the airflow through the suction gripper 100 so that a positive air is flowing out from gripping port 206. This reversal can be used to release and/or propel the target object 55 from the section cup assembly 215, purge dust from the vacuum system 140, and/or expel other materials (such as plastic bags or wraps) that were drawn into the internal airflow passage 220 of suction gripper 100. To implement reversible airflow, the vacuum generator 342 shown in FIGS. 4 and 4A may further comprise an airflow direction control piston 420 operated by the airflow control signal output from the robot control logic and electronics 160. Airflow direction control piston 420 comprises an extensible shaft 419 and stopper 418 positioned at and aligned with the exhaust port 416 of the Venturi chamber 414 (shown at 424). During a capture action, when a vacuum is pulled in from suction gripper 100, the extensible shaft 419 and is retracted into the piston 420 and stopper 418 pulled away from exhaust port 416 (as shown in FIG. 4) permitting air to exit from the exhaust port 416 of the Venturi chamber 414. To reverse the airflow so that positive airflow is pushed out from the suction gripper 100, the robot control logic and electronics 160 activates airflow direction control piston 420 to extend shaft 419 to insert stopper 418 into the exhaust port 416 (as shown in FIG. 4A). Blocking exhaust port 416 disrupts the normal airflow within the Venturi chamber 414 so that the pressurize air applied to input port 410 instead flows out from controlled airflow port 412 and into air supply tubing 344, thus resulting in the positive airflow out from gripping port 206. It should be understood that reversible airflow from vacuum system 140 may be achieved in other ways. For example, in one embodiment, vacuum generator 342 may comprise a switchable bypass valve or other similar mechanism with can be controlled by the robot control logic and electronics 160 to selectively switch the pressurized air supply between being applied to the input port 410 verses directly applied to the air supply tubing 344. In other words, the vacuum chamber 414 fills with compressed air reverses airflow, causing the vacuum hose 344 to "push out" any contaminants. In this way, the system 10 can self-clean.

In still another embodiment, the robotic vacuum sorting system 10 may include a pressure switch 143 (which may be coupled to or otherwise placed in the vacuum tubing 344, for example) in order that the system 10 can detect if, or to what degree, vacuum is achieved. If vacuum pressure above a predetermined threshold is detected during a capture action, this measurement may indicate a successful grasp of a target object 55. The lack of such detection may indicate that the robot 150 should attempt the grasp once again, or the robot control logic and electronics 160 may save this data in its memory for later use. Additionally, the robot control logic and electronics 160 may optionally detect an obstruction within the vacuum system 140 by activating the vacuum system when it is not attempting to pick up a target object 55. In this instance, no vacuum should be achieved, since the air should flow freely through the suction gripper 100 system. If a vacuum is detected, that may indicate that an undesirable object is obstructing the free flow of air. This pressure switch 143 may comprise any form of vacuum detection mechanism such as but not limited to an analogue or digital pressure switch, and may be wired, for example, to a programmable logic controller (PLC) that is part of the robot control logic and electronics 160.

Figure 5A:
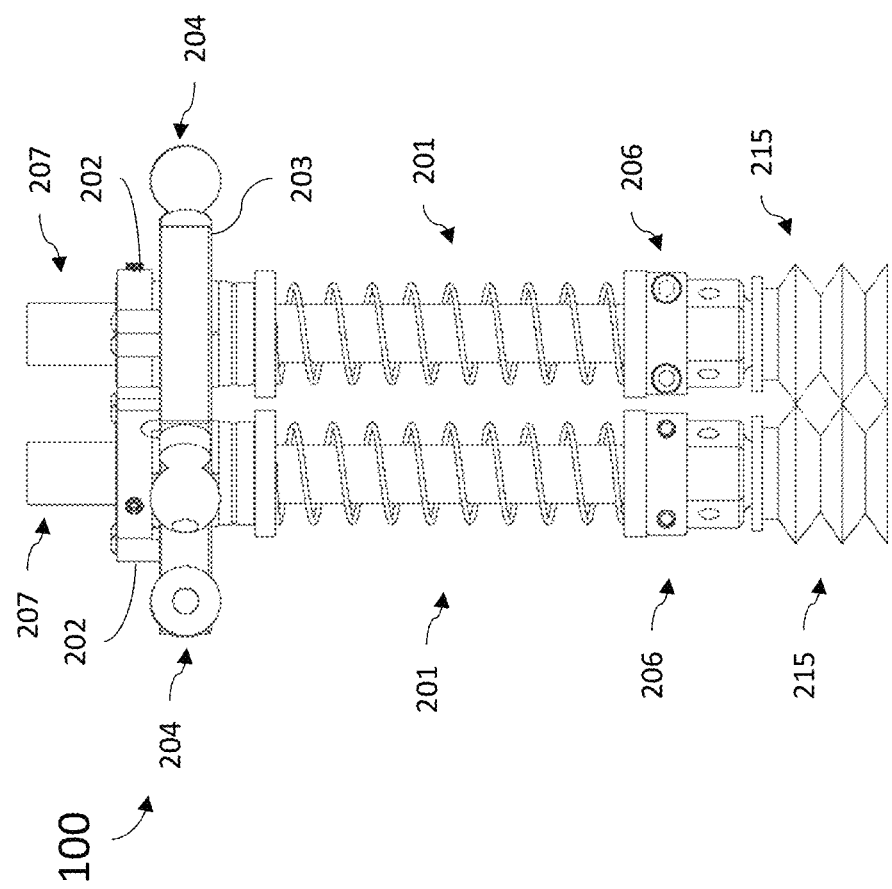
FIGS. 5 and 5A illustrate an alternative example suction gripper of one embodiment of the present disclosure.
Figure 5:
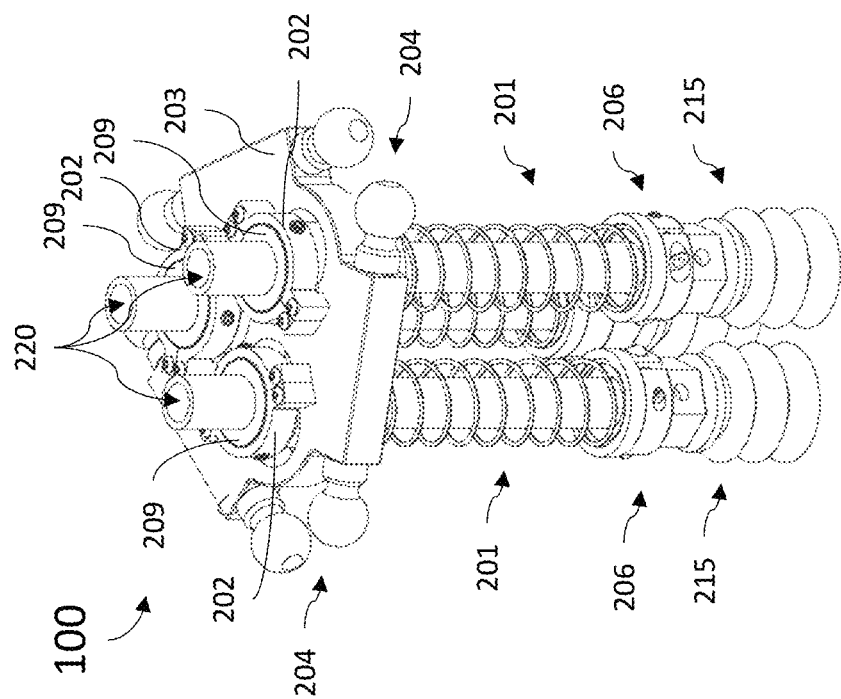

In still another alternate embodiment, such as shown in FIGS. 5 and 5A, a single suction gripper 100 may comprise multiple linear shafts 201 each within their own body assembly and linear bearing 209 in the same manner as described in any of the embodiments above, all held within a single mounting assembly 203 to secure this alternate suction gripper 100 to the robotic arms 354. FIGS. 5 and 5A provide an example showing a suction gripper 100 with three independently operating linear shafts 201, but other embodiments may have 2, or 4 or more independently operating linear shafts 201. Each of the multiple linear shafts 201 would comprise their own gripping port 206 with its associated suction cup assembly 215 so that each linear shaft 201 may essentially operate independently during a capture action to attempt to secure a target object 55. In some embodiments, each linear shaft may be coupled to the vacuum system 140 by dedicated tubing 344. In other embodiments, the airflow application ports 207 of each of the linear shafts 201 may be coupled to a common manifold that in turn is coupled the vacuum system 140. During a capture action, each linear shaft 201 can individually adjust in position and their associated suction cups conforms and needed accommodate the local surface contour of the target object. A suction gripper 100 comprising multiple linear shafts 201 increases the opportunity for system 10 to secure target objects 55.

Figure 6:
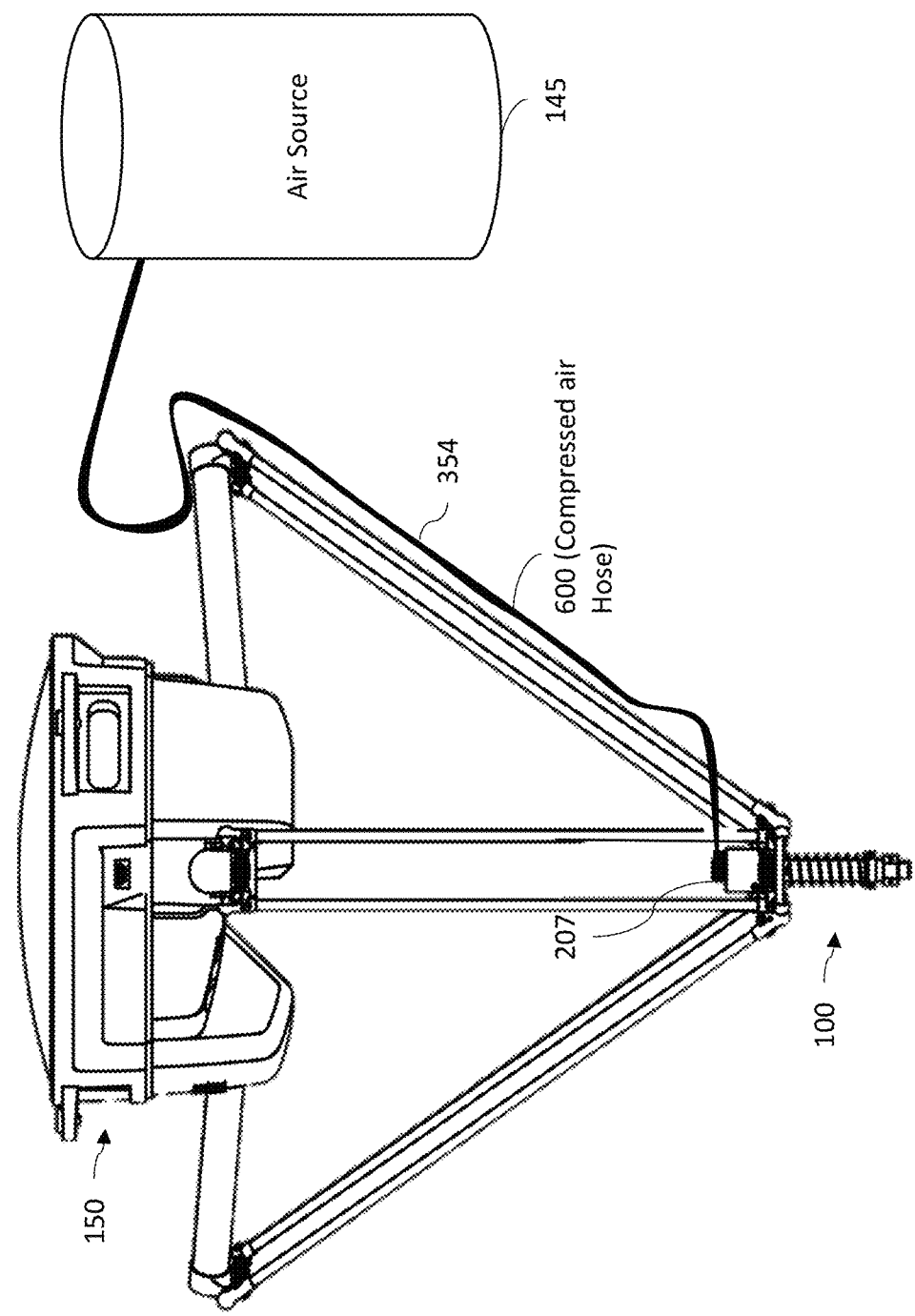
FIGS. 6, 7 and 8 illustrate another alternative example suction gripper of one embodiment of the present disclosure.
Figure 7:
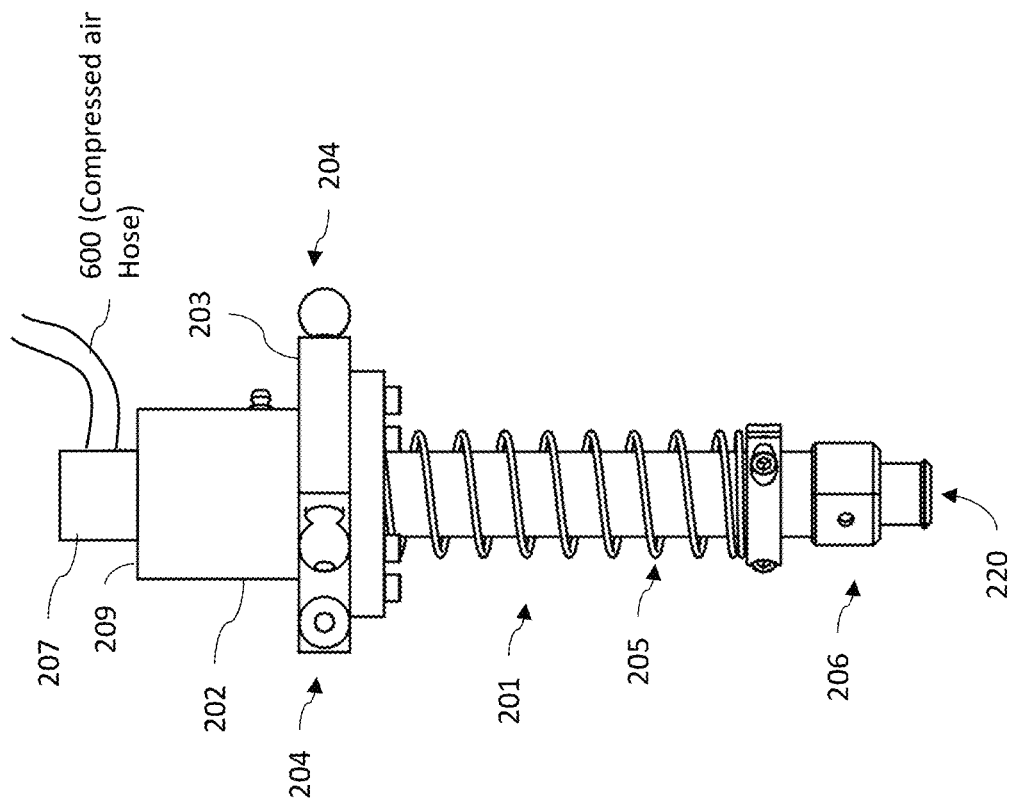
Figure 8:
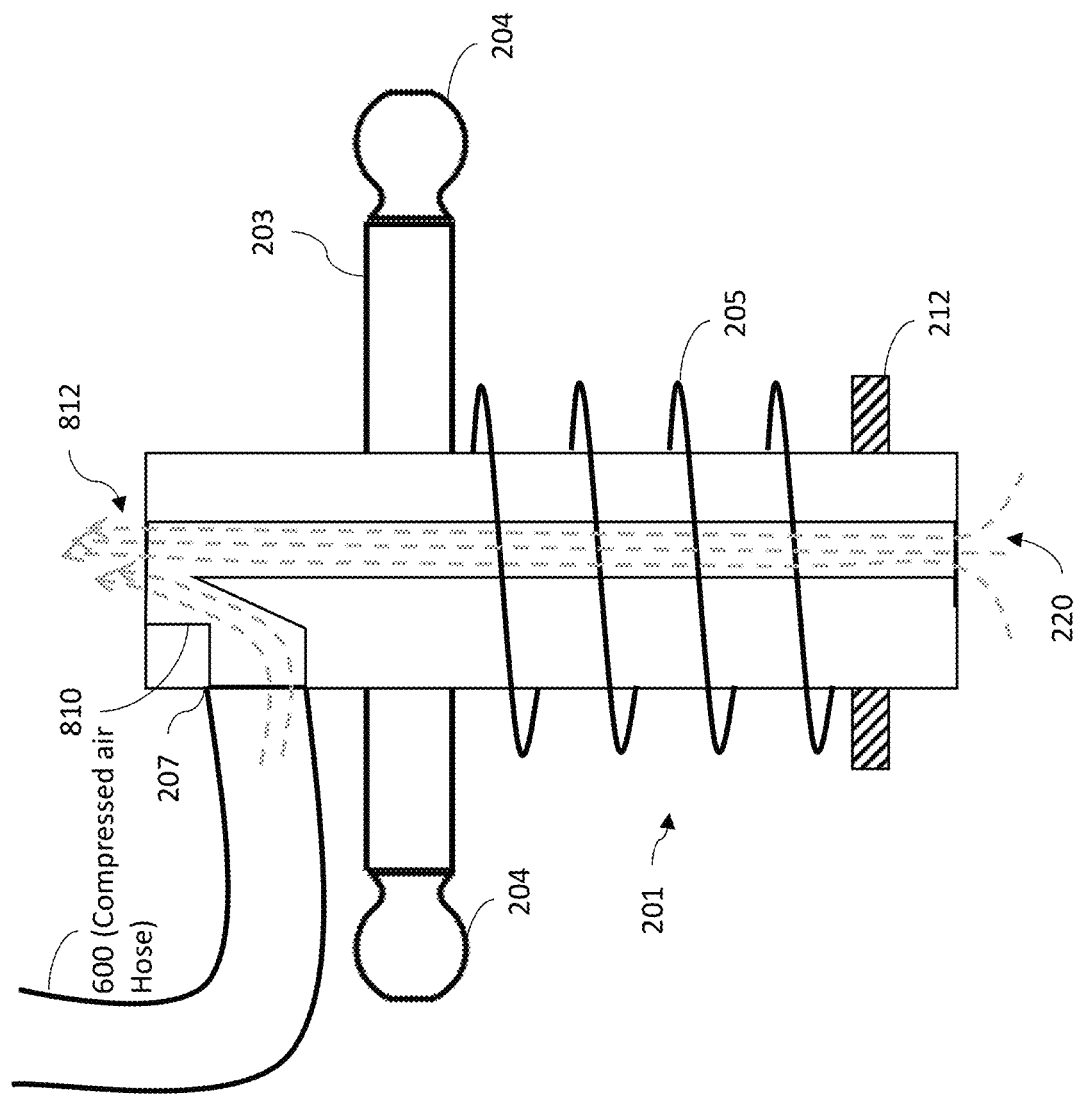

In still another alternate embodiment as shown in FIGS. 6, 7 and 8, the vacuum generating device 342 (operating under either Venturi or Coanda principles) may be embedded within or otherwise integrated with the linear shaft 201. As such, the air source 145 (which again may comprise a blower, an air compressor, a compressed air storage tank, or some combination thereof, for example) is coupled directly to the airflow application port 207 of the suction gripper 100 as shown in FIGS. 6 and 7.

In this instance, the linear shaft 201 is also the vacuum generating device 342 and therefore its exterior is to be a smooth shaft in order that the vacuum generating device can still slide within the linear bearing 209 mechanism in the same manner as described in any of the embodiments above. In this alternate suction gripper 100, the airflow application port 207 comprises a port to which compressed air is applied. The structural features 810 that generate the vacuum are located within the body of the shaft 201 (which may be either Venturi or Coanda structural features) and as the compressed air flows in the airflow application port 207 and out the exhaust port 812, it pulls the vacuum through the internal airflow passage 220 as illustrated in FIG. 8. The spring return mechanism 205 encompasses the body of the shaft 201 as described above. In some embodiments, airflow through the internal airflow passage 220 may be reversed by plugging the exhaust port 812 using a controlled stopper such as described above. One potential benefit of this particular implementation is the lack of hose in which vacuumed material can become lodged. Moreover, as the system generates the vacuum in the proximity of where it will be used, the strength and flow can be maintained with limited losses by avoiding additional couplings and tubing.

EXAMPLE EMBODIMENTS

Example 1 includes a robotic vacuum sorting system, the system comprising: a suction gripper mechanism pivotally mounted to one or more robotic arms of a sorting robot; a vacuum system coupled to the suction gripper mechanism; robot control logic and electronics coupled to the sorting robot and the vacuum system; and an imaging device coupled to the robot control logic and electronics; wherein, in response to an image signal from the imaging device, the robot control logic and electronics outputs one or more robot control signals to control the one or more robotic arms of the sorting robot, and outputs one or more airflow control signals to the vacuum system, to execute a capture action on a target object using the suction gripper; wherein during the capture action, the robot control logic and electronics outputs control signals such that the vacuum system pulls a vacuum at the gripping port of the suction gripper mechanism as the suction gripper mechanism is applied to capture and hold the target object.

Example 2 includes the system of example 1, wherein during the capture action, the robot control logic and electronics outputs control signals such that the vacuum system first pulls a vacuum at the gripping port of the suction gripper mechanism as the suction gripper mechanism is applied to capture and hold the target object and subsequently reverses air pressure to purge air from the gripping port of the suction gripper mechanism.

Example 3 includes the system of any of examples 1-2, the vacuum system configured to couple to an air source, wherein the vacuum system is configured to selectively convert a positive pressure air flow provided from the air source into a vacuum suction at the suction gripper mechanism.

Example 4 includes the system of any of examples 1-3, wherein the vacuum system comprises a vacuum generator; wherein the vacuum generator comprises a compressed air driven Venturi vacuum system or a compressed air driven Coanda vacuum system.

Example 5 includes the system of example 4, wherein the vacuum generator is integrated within the suction gripper mechanism.

Example 6 includes the system of any of examples 1-5, wherein the suction gripper mechanism comprises: a body assembly that houses a linear bearing component; a linear shaft element secured within the linear bearing and having a freedom to travel axially up and down with respect to an axis of the linear bearing; an internal airflow passage within the linear shaft configured to communicate an airflow between an airflow application port positioned at a first end of the linear shaft and a gripping port positioned at an opposing second end of the linear shaft; a suction cup assembly comprising a flexible cup element coupled to the gripping port by a removable coupler; and a mounting assembly rigidly secured around the body assembly, the mounting assembly further comprising one or more mounting points pivotally coupled to the one or more robotic arms of the sorting robot.

Example 7 includes the system of example 6, wherein the suction gripper mechanism further comprises: a spring mechanism positioned around an external circumference of the linear shaft between the mounting assembly and a stop device; wherein the spring mechanism is configured to extend the linear shaft to a fully extended position when the suction gripper mechanism is not holding the target object.

Example 8 includes the system of any of examples 6-7, wherein the linear shaft element has freedom to travel through the linear bearing to extend at least in part above mounting assembly during execution of the capture action in response to a force on the suction cup assembly from contacting the target object.

Example 9 includes the system of example 8, wherein the vacuum system comprises a vacuum generator coupled to the airflow application port of the suction gripper mechanism.

Example 10 includes the system of example 9, wherein the vacuum generator comprises: a chamber having a pressurized air input port, a controlled airflow port, and an exhaust port; wherein the pressurized air input port is coupled to the air source; and wherein the controlled airflow port is coupled to the airflow application port of the suction gripper mechanism.

Example 11 includes the system of example 10, wherein one or more structural features within the chamber are configured to create a negative air pressure at the controlled airflow port that pulls air into the chamber from the suction gripper mechanism creating suction at the gripping port.

Example 12 includes the system of any of examples 1-11, wherein the vacuum system comprises a vacuum generator, wherein the vacuum generator further comprises: an airflow direction control piston responsive to an airflow control signal output from the robot control logic and electronics; wherein the airflow direction control piston comprises: an extensible shaft having a stopper, the extensible shaft aligned with the exhaust port of the chamber; wherein during execution of a capture action, the robot control logic and electronics operates the airflow direction control piston to retract the extensible shaft to configure the vacuum generator to pull a negative pressure vacuum airflow at the gripping port of the suction gripper mechanism; and wherein during execution of a capture action, the robot control logic and electronics operates the airflow direction control piston to extend the extensible shaft to plug the exhaust port of the chamber to configure the vacuum generator push a positive pressure airflow out from the gripping port of the suction gripper mechanism.

Example 13 includes the system of any of examples 1-12, wherein the suction gripper mechanism further comprises: a plurality of body assemblies each housing a respective linear bearing component and a respective linear shaft element secured within the respective linear bearing assembly; wherein each linear shaft element comprises an internal airflow passage configured to communicate an airflow between an airflow application port positioned at a first end of the linear shaft element and a gripping port positioned at an opposing second end of the linear shaft.

Example 14 includes a suction gripper mechanism, the mechanism comprising: a body assembly that houses a linear bearing component; a linear shaft element secured within the linear bearing and having a freedom to travel axially up and down with respect to an axis of the linear bearing; an internal airflow passage within the linear shaft configured to communicate an airflow between an airflow application port positioned at a first end of the linear shaft and a gripping port positioned at an opposing second end of the linear shaft; a replaceable coupler configured to mechanically couple to the gripping port and configured to secure a flexible suction cup to the replaceable coupler.

Example 15 includes the mechanism of example 14, wherein the replaceable coupler comprises either a barbed lip or a recess for securing the flexible suction cup.

Example 16 includes the mechanism of any of examples 14-15, further comprising a vacuum generator integrated within the body assembly, wherein the internal airflow passage passes through the vacuum generator; and wherein the airflow application port is coupled to the vacuum generator; wherein the vacuum generator comprises structural features configured to pull a vacuum through the internal airflow passage when compressed air is applied to the airflow application port.

Example 17 includes the mechanism of example 16, wherein the vacuum generator is configured to pull at least 5 SCFM of air through the gripping port.

Example 18 includes the mechanism of any of examples 14-17, wherein an intake opening of the gripping port has an area greater than or equal to an area of a ¼ inch diameter opening.

Example 19 includes a robotic vacuum sorting system, the system comprising: a suction gripper mechanism pivotally mounted to one or more robotic arms of a sorting robot; a reversible vacuum system coupled to the suction gripper mechanism; robot control logic and electronics coupled to the sorting robot and the reversible vacuum system; and an imaging device coupled to the robot control logic and electronics; wherein, in response to an image signal from the imaging device, the robot control logic and electronics outputs one or more robot control signals to control the one or more robotic arms of the sorting robot, and outputs one or more airflow control signals to the reversible vacuum system, to execute a capture action on a target object using the suction gripper; wherein during the capture action, the robot control logic and electronics outputs control signals such that the reversible vacuum system first pulls a vacuum at the gripping port of the suction gripper mechanism as the suction gripper mechanism is applied to capture and hold the target object and subsequently reverses air pressure to purge air from the gripping port of the suction gripper mechanism; wherein the vacuum system comprises a vacuum generator integrated within the suction gripper mechanism.

Example 20 includes the system of example 19, wherein the suction gripper mechanism comprises: a body assembly that houses a linear bearing component; a linear shaft element secured within the linear bearing and having a freedom to travel axially up and down with respect to an axis of the linear bearing; an internal airflow passage within the linear shaft configured to communicate an airflow between an airflow application port positioned at a first end of the linear shaft and a gripping port positioned at an opposing second end of the linear shaft; a replaceable coupler configured to mechanically couple to the gripping port and configured to secure a flexible suction cup to the replaceable coupler.

Example 21 includes the system of any of examples 19-20, wherein the vacuum generator comprises a compressed air driven Venturi vacuum system or a compressed air driven Coanda vacuum system.

Example 22 includes the system of any of examples 19-21, wherein the vacuum generator is configured to pull at least 5 SCFM of air through the gripping port.

Example 23 includes the system of any of examples 19-22, wherein an intake opening of the gripping port has an area greater than or equal to an area of a ⅜ inch diameter opening.

In various alternative embodiments, system elements, method steps, or examples described throughout this disclosure (such as the sorting robot, robot control logic & electronics, imaging devices and/or sub-parts of any thereof, for example) may be implemented using one or more computer systems, field programmable gate arrays (FPGAs), or similar devices and/or comprising a processor coupled to a memory and executing code to realize those elements, processes, steps or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A sorting system, comprising:
    a processor configured to:
        receive an image signal from an imaging device;
        in response to the image signal:
            cause one or more robotic arms of the sorting system to be positioned over a target object;
            cause the one or more robotic arms to lower a suction gripper towards the target object, wherein the suction gripper is coupled to the one or more robotic arms, wherein the suction gripper comprises a linear shaft that is coupled to a corresponding suction cup, wherein the linear shaft is adjustable in position;
            cause a vacuum system to pull a vacuum through the suction gripper to pick up the target object; and
            cause the vacuum system to reverse air pressure to send a positive airflow through the suction gripper to release the target object; and
    a memory coupled to the processor and configured to processor with instructions.

2. The sorting system of claim 1, wherein the processor is further configured to cause the vacuum system to pull the vacuum through the suction gripper to pick up the target object by selecting a corresponding supply of pressurized air.

3. The sorting system of claim 1, wherein the vacuum system, comprises a reversible airflow generator.

4. The sorting system of claim 1, wherein the processor is further configured to:
    receive a vacuum pressure from a pressure sensor; and
    compare the vacuum pressure to a predetermined threshold.

5. The sorting system of claim 4, wherein the processor is further configured to:
    determine that the vacuum pressure is equal to or greater than the predetermined threshold; and
    determine that the target object has been successfully grasped.

6. The sorting system of claim 4, wherein the processor is further configured to:
    determine that the vacuum pressure is less than the predetermined threshold; and
    determine that the target object has not been successfully grasped.

7. The sorting system of claim 6, wherein the processor is further configured to cause the vacuum system to pull the vacuum through the suction gripper in a subsequent attempt to pick up the target object.

8. The sorting system of claim 6, wherein the processor is further configured to store the determination that the target object has not been successfully grasped in the memory.

9. The sorting system of claim 1, wherein the processor is further configured to determine whether an obstruction is present in the vacuum system including to:
    determine that the one or more robotic arms have not been lowered towards the target object;
    activate the vacuum system; and
    determine whether the vacuum through the suction gripper is detected.

10. The sorting system of claim 9, wherein the processor is further configured to:
    determine that the vacuum through the suction gripper is detected; and
    determine that the obstruction is present with the vacuum system.

11. The sorting system of claim 9, wherein the processor is further configured to:
    determine that the vacuum through the suction gripper is not detected; and
    determine that the obstruction is not present with the vacuum system.

12. The sorting system of claim 1, wherein the vacuum system is associated with an air source, wherein the air source comprises one or more of the following: a blower, an air compressor, and a compressed air storage tank.

13. The sorting system of claim 1, wherein the vacuum system comprises a vacuum generator, wherein the vacuum generator comprises a compressed air driven Venturi vacuum system.

14. The sorting system of claim 1, wherein the vacuum system comprises a vacuum generator, wherein the vacuum generator comprises a compressed air driven Coanda vacuum system.

15. A sorting system, comprising:
    a processor configured to:
        receive an image signal from an imaging device;
        in response to the image signal:
            cause one or more robotic arms of the sorting system to be positioned over a target object;
            cause the one or more robotic arms to lower a suction gripper towards the target object, wherein the suction gripper is coupled to the one or more robotic arms, wherein the suction gripper comprises a plurality of linear shafts that is coupled to a corresponding respective plurality of suction cups, wherein each linear shaft of the plurality of linear shafts is independently adjustable in position;
            cause a vacuum system to pull a vacuum through the suction gripper to pick up the target object; and
            cause the vacuum system to reverse air pressure to send a positive airflow through the suction gripper to release the target object; and
    a memory coupled to the processor and configured to processor with instructions.

16. The sorting system of claim 15, wherein the processor is further configured to cause the vacuum system to pull the vacuum through the suction gripper to pick up the target object by selecting a corresponding supply of pressurized air.

17. The sorting system of claim 15, wherein the vacuum system, comprises a reversible airflow generator.

18. The sorting system of claim 15, wherein the processor is further configured to:
    receive a vacuum pressure from a pressure sensor; and
    compare the vacuum pressure to a predetermined threshold.

19. The sorting system of claim 18, wherein the processor is further configured to:
   determine that the vacuum pressure is equal to or greater than the predetermined threshold; and
   determine that the target object has been successfully grasped.

20. The sorting system of claim 18, wherein the processor is further configured to:
   determine that the vacuum pressure is less than the predetermined threshold; and
   determine that the target object has not been successfully grasped.

21. The sorting system of claim 20, wherein the processor is further configured to cause the vacuum system to pull the vacuum through the suction gripper in a subsequent attempt to pick up the target object.

22. The sorting system of claim 20, wherein the processor is further configured to store the determination that the target object has not been successfully grasped in the memory.

23. The sorting system of claim 15, wherein the processor is further configured to determine whether an obstruction is present in the vacuum system including to:
   determine that the one or more robotic arms have not been lowered towards the target object;
   activate the vacuum system; and
   determine whether the vacuum through the suction gripper is detected.

24. The sorting system of claim 23, wherein the processor is further configured to:
   determine that the vacuum through the suction gripper is detected; and
   determine that the obstruction is present with the vacuum system.

25. The sorting system of claim 23, wherein the processor is further configured to:
   determine that the vacuum through the suction gripper is not detected; and
   determine that the obstruction is not present with the vacuum system.

26. The sorting system of claim 15, wherein the vacuum system is associated with an air source, wherein the air source comprises one or more of the following: a blower, an air compressor, and a compressed air storage tank.

27. The sorting system of claim 15, wherein the vacuum system comprises a vacuum generator, wherein the vacuum generator comprises a compressed air driven Venturi vacuum system.

28. The sorting system of claim 15, wherein the vacuum system comprises a vacuum generator, wherein the vacuum generator comprises a compressed air driven Coanda vacuum system.

* * * * *

UNITED STATES PATENT AND TRADEMARK OFFICE
CERTIFICATE OF CORRECTION

PATENT NO. : 11,059,075 B2
APPLICATION NO. : 17/084339
DATED : July 13, 2021
INVENTOR(S) : John C. McCoy, Jr., Matanya B. Horowitz and James A. Bailey Page 1 of 1

It is certified that error appears in the above-identified patent and that said Letters Patent is hereby corrected as shown below:

On the Title Page

In page 2, Column 2, item (56), other publications, cite no. 4, delete "lifling" and insert --lifting--, therefor.

In the Specification

In Column 12, Line(s) 43, delete "a %" and insert --a ¼--, therefor.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*